US005113997A

United States Patent [19]

Hunziker

[11] Patent Number: 5,113,997

[45] Date of Patent: May 19, 1992

[54] VENEER STRIP CHARGING APPARATUS

[75] Inventor: Ernst Hunziker, Othmarsingen, Switzerland

[73] Assignee: M & S Brugg AG, Brugg, Switzerland

[21] Appl. No.: 695,215

[22] Filed: May 3, 1991

[30] Foreign Application Priority Data

May 15, 1990 [DE] Fed. Rep. of Germany ....... 4015572

[51] Int. Cl.[5] .............................................. B65G 43/08

[52] U.S. Cl. .................................... 198/460; 198/462; 271/198; 271/275; 271/243; 271/199

[58] Field of Search ............... 271/189, 198, 271, 275, 271/233, 199, 235, 243; 198/419.3, 462, 460; 221/77, 84, 85

[56] References Cited

U.S. PATENT DOCUMENTS 3,446,336 5/1969 Hunziker .......................... 271/69 X

FOREIGN PATENT DOCUMENTS 0217450 9/1986 Japan .................................. 271/271

*Primary Examiner*—H. Grant Skaggs
*Assistant Examiner*—Carol Lynn Druzbick
*Attorney, Agent, or Firm*—Tarolli, Sundheim & Covell

[57] ABSTRACT

The veneer strip charging apparatus comprises a belt conveyor with a plurality of conveyor belts evenly distributed over the width of the apparatus. The belt conveyors transport the veneer strip placed thereon only by means of static friction. Furthermore, there are provided a plurality of spacer members circulating in endless closed guiding tracks. The spacer members engage between the individual veneer strips along the conveying path besides the conveyor belts and are moved along the feeding path by the veneer strips. These spacer members together with their guiding tracks are located below the conveyance level. By this measure, an unhindered view is ensured to the veneer strip contained in the apparatus. Furthermore, even thin veneer strips can be processed without a risk of damage thereof, and the apparatus is much simpler in design.

18 Claims, 5 Drawing Sheets

VENEER STRIP CHARGING APPARATUS

FIELD OF THE INVENTION

The present invention refers to a veneer strip charging apparatus for feeding veneer strips into an apparatus for joining the veneer strips to form a veneer sheet by mutually gluing together the individual veneer strips along their longitudinal edges. Particularly, the charging apparatus comprises a conveying means adapted to move the individually delivered veneer strips along a horizontal path in a direction transverse to their longitudinal extension. The conveying means comprises a plurality of conveying units operating in a plurality of parallel tracks uniformly distributed over the width of the veneer strip charging apparatus.

A plurality of spacer means is provided and freely movably guided in the direction of movement of the veneer strips and circulating in endless circulation tracks. Thereby, the spacer means engage between the individual veneer strips along the conveying path thereof.

PRIOR ART

A veneer strip charging apparatus of this kind is disclosed, for instance, in the German Patent Specification Nr. 1,628,970. This veneer strip charging apparatus comprises, as a conveying means, a roller conveyor installation. There are provided a plurality of conveying tracks and each conveying track comprises a row of driven conveyor rollers provided with a safety slip clutch as well as a row of freely rotatable pressure rollers being under the influence of spring means and located opposite to said conveyor rollers. Usually, the conveyor rollers are situated below the conveyance level and the pressure rollers are situated above the conveyance level. All equiaxed conveyor rollers are mounted on common driving shafts extending over the entire width of the veneer strip charging apparatus and being connected, at their one free end, to a gear mechanism which itself is driven by a common driving motor.

The pressure rollers are mounted in rows on a plurality of beams which are adjustable in height. Due to dimensional reasons, the means for guiding the spacer members are located above the conveyance level where they find place between the rows of pressure rollers and their mountings. There would be no sufficient space therefor below the conveyance level due to the provision of the continuous driving shafts for driving the conveyor rollers.

The above described apparatus has an essential drawback: Due to the presence of the numerous parts above the conveyance level, the view to the conveyance level and to the veneer strips conveyed therealong is obstructed. Consequently, the operator of the veneer strip charging apparatus lacks the overall view over the apparatus and, particularly, he cannot check the proper function, i.e. the proper charging of the veneer strips. In the case of the manufacture of cover veneer sheets, the operator cannot see the surface of the veneer sheet to be created, particularly not the design thereof with the result that the selection of suitable veneer strips for creating an aesthetically attractive design is rendered more difficult.

Additionally, experience has shown that the roller conveyor provided in the above described apparatus is not well suited for conveying thin veneer strips, e.g. veneer strips having a thickness of 0.6 mm or less which are used to manufacture decorative surface veneer sheets. Particularly, the propulsion force exerted to the veneer strips and created by the safety slip clutches cannot be adjusted finely enough with the result that too high forces occur if the veneer strips are dammed up and the veneer strips are damaged.

Finally, the constructional means for the realization and the operation of such a veneer strip charging apparatus are complicated and expensive. A great number of parts are required which all have to be machined very precisely such that the manufacturing costs particularly for the many bearings and gear parts are very high with such a design of a veneer strip charging apparatus.

Another veneer strip charging apparatus is disclosed in German Patent Specification Nr. 2,828,901. Described therein is an installation for joining and gluing together veneer strips whereby stepwise a plurality of veneer strips, which have been previously fixed in a certain position, are glued together to veneer sheets between two pressure plates. As charging means, there is provided a for-and-back movable table on which the veneer strips are prepared in the desired arrangement. No conveying means are provided in this apparatus.

On the other side, spacer means are provided which are manually displaceable in a plurality of grooves provided in the aforementioned table and which are displaced with the manually fed veneer strips towards the previously placed veneer strip. Thereafter, the table containing the prepared veneer strip is displaced between the aforementioned pressure plates. In this position, the veneer strips are fixed to the upper pressure plate whereafter the table can be moved back. Finally, the joining and gluing together of the veneer strips is effected in the apparatus.

This apparatus is not suited for continuously feeding veneer strips to a gluing apparatus for continuously manufacturing veneer sheets.

OBJECTS OF THE INVENTION

It is an object of the present invention to provide a veneer strip charging apparatus for feeding veneer strips into an apparatus for joining the veneer strips to form a veneer sheet by mutually gluing together the individual veneer strips along their longitudinal edges in which the view to the veneer strips contained in the apparatus and processed thereby is freely accessible and not obstructed by any parts or elements of the apparatus.

It is a further object of the present invention to provide a veneer strip charging apparatus for feeding veneer strips into an apparatus for joining the veneer strips to form a veneer sheet by mutually gluing together the individual veneer strips along their longitudinal edges in which also very thin veneer strips can be processed without the danger of damage to them.

It is a still further object of the present invention to provide a veneer strip charging apparatus for feeding veneer strips into an apparatus for joining the veneer strips to form a veneer sheet by mutually gluing together the individual veneer strips along their longitudinal edges which automatically and continuously feeds selected veneer strips to a joining and gluing apparatus for the continuous manufacturing of veneer sheets or veneer tracks.

Finally, it is an object of the present invention to provide a veneer strip charging apparatus for feeding veneer strips into an apparatus for joining the veneer strips to form a veneer sheet by mutually gluing together the individual veneer strips along their longitudinal edges which is much simpler in design than known apparatusses of this kind and, thus, can be manufactured at lower cost and is more reliable in operation.

SUMMARY OF THE INVENTION

According to the invention, there is provided a veneer strip charging apparatus for feeding veneer strips into an apparatus for joining the veneer strips to form a veneer sheet by mutually gluing together the individual veneer strips along their longitudinal edges. The charging apparatus comprises a conveying means adapted to move the individually delivered veneer strips along a horizontal path in a direction transverse to their longitudinal extension. The conveying means comprises a plurality of conveyor belts operating in a plurality of parallel tracks uniformly distributed over the width of the veneer strip charging apparatus and supported by and gliding on a supporting plate, whereby the conveyor belts serve as supporting members for a plurality of veneer strips which are thereby moved along the conveying path solely under the influence of static friction between the veneer strips and the conveyor belts.

Further, there is provided a plurality of spacer means freely movably guided in the direction of movement of said veneer strips and circulating in endless circulation tracks. The spacer means engage between the individual veneer strips along the conveying path thereof and are located beside the conveyor belts. Thereby, the spacer means are forced to a movement along the endless circulation tracks by the veneer strips. The endless circulation tracks comprises guiding means for the spacer means which are located below the level of conveyance.

By using conveyor belts of the kind mentioned above, the view to essentially the entire conveying level is free because all driving and guiding means for the conveyor belts are located below the conveyance level. Furthermore, the space requirements for these driving and guiding means is limited to the edge regions of the conveyance level such that enough space is available below the conveyance level for the means for guiding the spacer means.

Tests performed by the inventor have proven that such a conveyor belt arrangement is reliably in a position to convey veneer strips of all kinds together with the spacer means trailed by the veneer strips without any problems, only by using the static friction between the veneer strips and the conveyor belts, if the conveyor belts are appropriately chosen as far as the material and the structure of their surface is concerned. Since the propulsion force exerted by the conveyor belts may be kept relatively small without the need to provide particular control mechanisms or devices, there is no danger at any point of the conveying path whatsoever that particularly high forces could occur which could lead to a damage of the veneer strips or to a disturbance of the conveying operation.

By replacing the roller conveyors already known in the art in connection with such an apparatus for feeding veneer strips into an apparatus for joining the veneer strips to form a veneer sheet by mutually gluing together the individual veneer strips along their longitudinal edges by belt conveyors, the additional advantage is gained that the design and the operation thereof is much simpler; particularly, there is no need to provide a plurality of shafts, bearings, rollers, safety slip clutches and means for height adjustment of the pressure rollers as is required in an apparatus known in the prior art. Furthermore, the proper operation of a belt conveyor is much less dependent of the ambient temperature than the operation of a roller conveyor, and the operating noise is much less with a belt conveyor.

The apparatus according to the German Patent Specification Nr. 1,628,970 provides a design in which the spacer means are equipped with rollers which are received and guided in a guiding rail. Each guiding rail forms a closed continuous guiding track for the spacer means extending in a vertical plane. Each guiding rail comprises a horizontally extending first portion located immediately above the conveyance level as well as a downwardly inclined second portion located above the first portion. The said first and second portions are connected to each other, at the input side of the veneer strip charging apparatus, by a reversing arc portion and, at the output side of the veneer strip charging apparatus, by a shaft portion. A continuously operating elevator device extends over the entire height of the shaft portion and feeds the spacer means arriving from the first portion upwards through the shaft portion into the second portion of the guiding rail. At the end of said second portion, there is provided a stop mechanism which is adapted to stepwisely release the spacer means held back at this stop mechanism one after another one to move into said first portion of the guiding rail. In order to control said stop mechanism, a mechanical sensor is provided which is operated by each leading longitudinal edge of a veneer strip fed to the roller conveyor of this apparatus.

Basically, it is possible to design the spacer means and the means for guiding them in a continuous circulation path of the apparatus according to the invention essentially equal to the ones disclosed in the above mentioned German Patent Specification Nr. 1,628,970.

However, it seems advantageous to use another solution in which each of the guiding rails comprises a first portion extending horizontally and immediately below the conveyance level, a second portion located below the first portion, the first and the second portion being joined together, at the output side of the charging apparatus, by means of a reversing arc portion and, at the input side of the charging apparatus, by means of a vertically extending shaft portion. The second portion is downwards inclined towards the shaft portion and the shaft portion is provided with an elevator means adapted to convey the spacer means arriving from the first portion through the shaft portion upwards to the beginning of the first portion.

Even if it appears that this proposed design could be only a reversed and, as far as the conveyance level is concerned, mirrored design of the design disclosed in the prior art, it must be emphasized that the proposed design offers substantial advantages over the known design as far as the means for the recirculation of the spacer means into the first portion of the guiding rail is concerned. These advantages cannot be realized in the known solution.

Particularly, a preferred embodiment is provided according to the invention in which the elevator means is located at the lower end of the shaft portion and in which the elevator means is stepwise operating and controlled by the fed veneer strips such that, upon the arrival of a veneer strip, one of the spacer means arriving along the second portion is grasped and fed into the shaft portion whereby all spacer means already present in the shaft portion are moved upwards by an amount sufficient to push the uppermost spacer means in the shaft portion out of it and into the first portion. On the one hand, by this measure, the previously required stop mechanism is no more necessary; on the other hand, the proposed elevator device requires much less space than the elevator means disclosed in the prior art.

The elevator means can comprise a star wheel adapted to grasp one of said spacer means arriving along the second portion, preferably at their roller means. If each of said spacer means is provided with two pairs of roller means arranged one behind the other, seen in the direction of movement of said spacer means, it is advantageous when the star wheel is designed such that it simultaneously grasps the back roller means pair of one of the spacer means and the front roller pair of the subsequent spacer means.

The elevator means can comprise a ratchet mechanism whereby there is provided a pneumatic or hydraulic cylinder means adapted to operate the ratchet mechanism.

For the operation of the elevator means, there may be provided a plurality of photoelectric barrier means each assigned to one of the elevator means. The photoelectric barrier means comprises a vertically running beam crossing the path of the veneer strips moved by the charging apparatus whereby the passing of the lagging edge of a veneer strip causes the elevator means to operate for one step. By the proposed optical sensing, in contrary to the mechanical sensing known in the prior art, any disturbance of the conveying operation or a possible damage of the veneer strip is avoided.

Similarly as known from the prior art, an end portion of the first portion of the guiding rail can be downwardly inclined for the removal of the spacer means from the conveyance level such that the spacer means, after having arrived at the end of the end portion, are out of engagement with the veneer strips. Thereby, the advantage is achieved that the spacer means, during their removal out of the conveyance level, maintain an unchanged angular position with regard to the conveyance level in order to avoid uncontrolled movements of the veneer strips in vertical direction.

Due to the same reason, it would be advantageous if the spacer means would extend perpendicularly to the conveyance level not only in the horizontally extending portion of the first portion of the guiding rail, but also in the downwardly inclined partial portion of said first portion, such that the surfaces of the spacer means against which the veneer strip abut are always oriented perpendicularly with respect to the longitudinal edges of the veneer strip. However, since this a theoretical ideal case which cannot be realized in practice, and in an attempt to come as close as possible to the ideal situation despite of the change of direction of the guiding rail at the transition from the horizontally extending portion to the downwardly inclined portion, it is proposed according to the invention that the spacer means protrude from the guiding rail in an angle of incidence which differs from the perpendicular to the guiding rail. Thereby, the angle of coincidence is chosen such that the angular orientation of the spacer means differs by the same amount from the perpendicular to the conveyance level either when the spacer means are in said horizontally extending first portion of said guiding rail or in said downwardly inclined end portion of said first portion of said guiding rail.

If the spacer means comprise, as known in the previous art, wedge-shaped abutment surfaces because the wedge shape favours the removal of the spacer means from the space between two adjacent veneer strips, the above explained ideal situation can be realized only for one of the abutment surfaces of the spacer means. With other words, in the horizontally extending portion of the guiding rail, the front abutment surface can extend essentially perpendicular to the conveyance level, and in the downwardly inclined portion of the guiding rail, the back abutment surface can extend essentially perpendicular to the conveyance level.

During the manufacture of an endless veneer track which is separated into single veneer sheets in a subsequent operating step, the damming-up effect in the veneer strip feeding apparatus is present only due to the higher speed of the feeding means in the feeding apparatus as compared to the apparatus for joining and gluing together the veneer strips; the ratio can typically amount to 2:1. However, the present invention provided for the possibility to manufacture individual veneer sheets as follows: A predetermined number of veneer strips sufficient for the manufacture of the desired veneer sheet is fed to the charging apparatus and is dammed-up therein. Thereafter, it is fed to the apparatus for joining and gluing together as a common package. To this purpose, the apparatus of the invention can be provided with a stop means at the end of the first portion of the guiding rail. The stop means has a catch member movable into and out of the guiding track of the spacer means for stopping the veneer strips on order to discontinuate the veneer sheet to be formed. Preferably, the stop means is located in such a place that it is effective in the region of the downwardly inclined end portion of the first portion of the guiding rail.

Under certain circumstances, particularly if relatively thick veneer strips have to processed or veneer strips which are not flat, it may be advantageous to take measures to bring tho veneer strips in a configuration as flat as possible prior to feeding them into the apparatus for joining and gluing together the veneer strips. Furthermore, the need can arise to increase the propulsion force in the take-over zone from the charging apparatus to the apparatus for joining and gluing together the veneer strips, since the propulsion force exerted to the veneer strip is relatively low and based only on the static friction between the surface of the conveyor belts and the surface of the veneer strips. To this purpose, there are provided a plurality of holding-down means located at the end of the conveyance path for the veneer strips and cooperating with the conveyor belts, said holding-down means pressing the veneer strips to be transmitted to the apparatus for joining and gluing together the veneer strips down against the conveyance level in order to ensure an improved propulsion thereof. According to a preferred embodiment, each of the holdingdown means can comprise a freely rotatable pressure roller cooperating with the final deflection pulley of the assigned conveyor belt, said pressure roller being looped by a flat belt having a portion which runs in an acute angle towards the conveyance level.

Preferably, the apparatus of the invention can be provided with a plurality of guiding rulers located above the conveyance lever and opposite to the conveyor belts, said guiding rulers extending over at least a part of the conveying path of the veneer strips. Thereby, it is understood that the guiding rulers are arranged with regard to their height position such that the level formed by their sliding track is located below the level which is formed by the tips of the spacer means in order to ensure that the spacer means are engaged in any case by the veneer strips, i.e. particularly even in the case when the veneer strips are not flat and abut against the lower guiding surfaces of the guiding rulers.

Experience and test have shown that the friction forces occurring due to the contact between the uneven veneer strips and the guiding rulers are such low that the reliable feeding of the veneer strips by means of the belt conveyors is not impaired.

BRIEF DESCRIPTION OF THE DRAWINGS

In the following, an embodiment of the apparatus of the invention will be further described, with reference to the accompanying drawings, in which.

Figure 1:
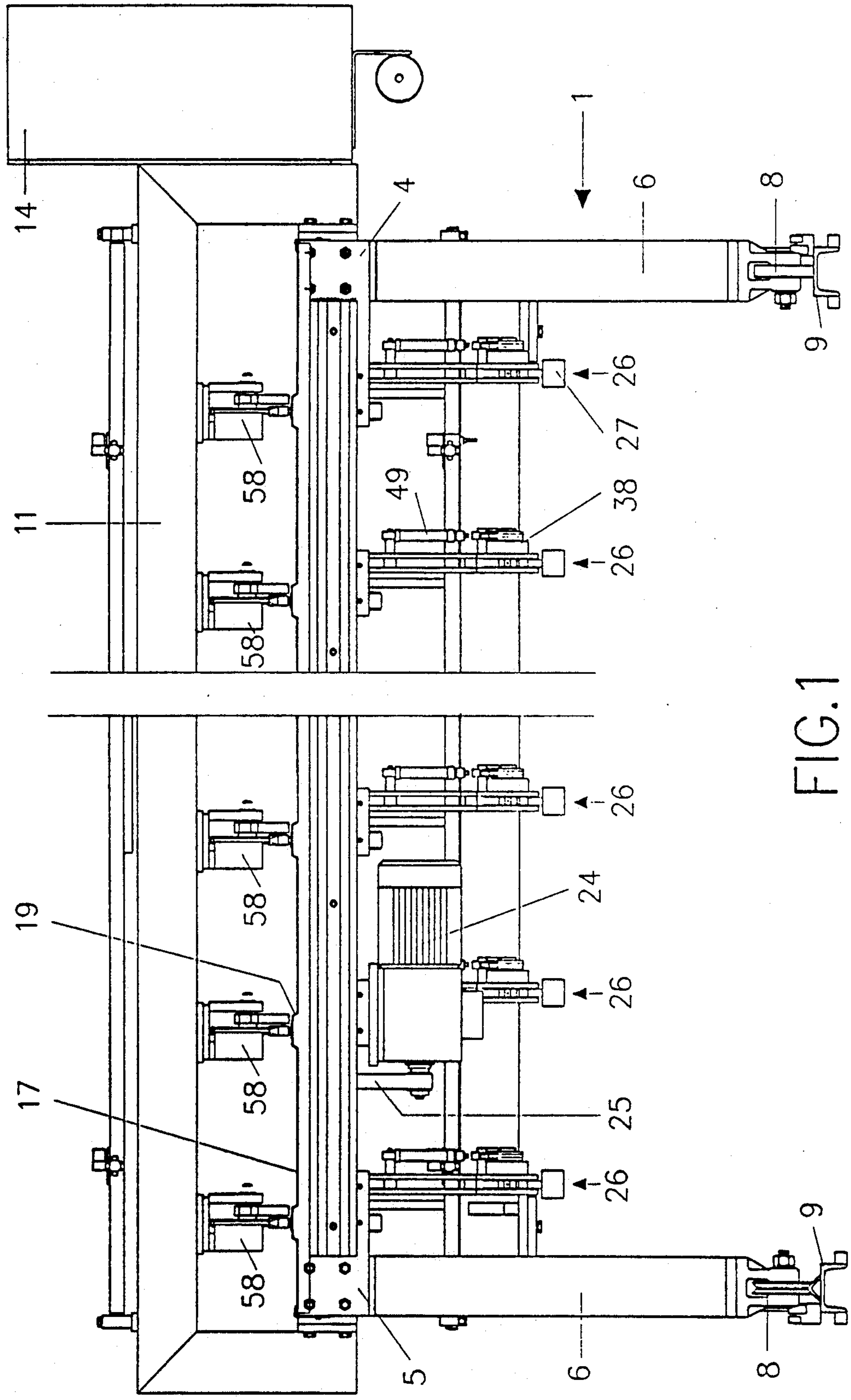
FIG. 1 shows a front view of a veneer strip charging apparatus.
Figure 2:
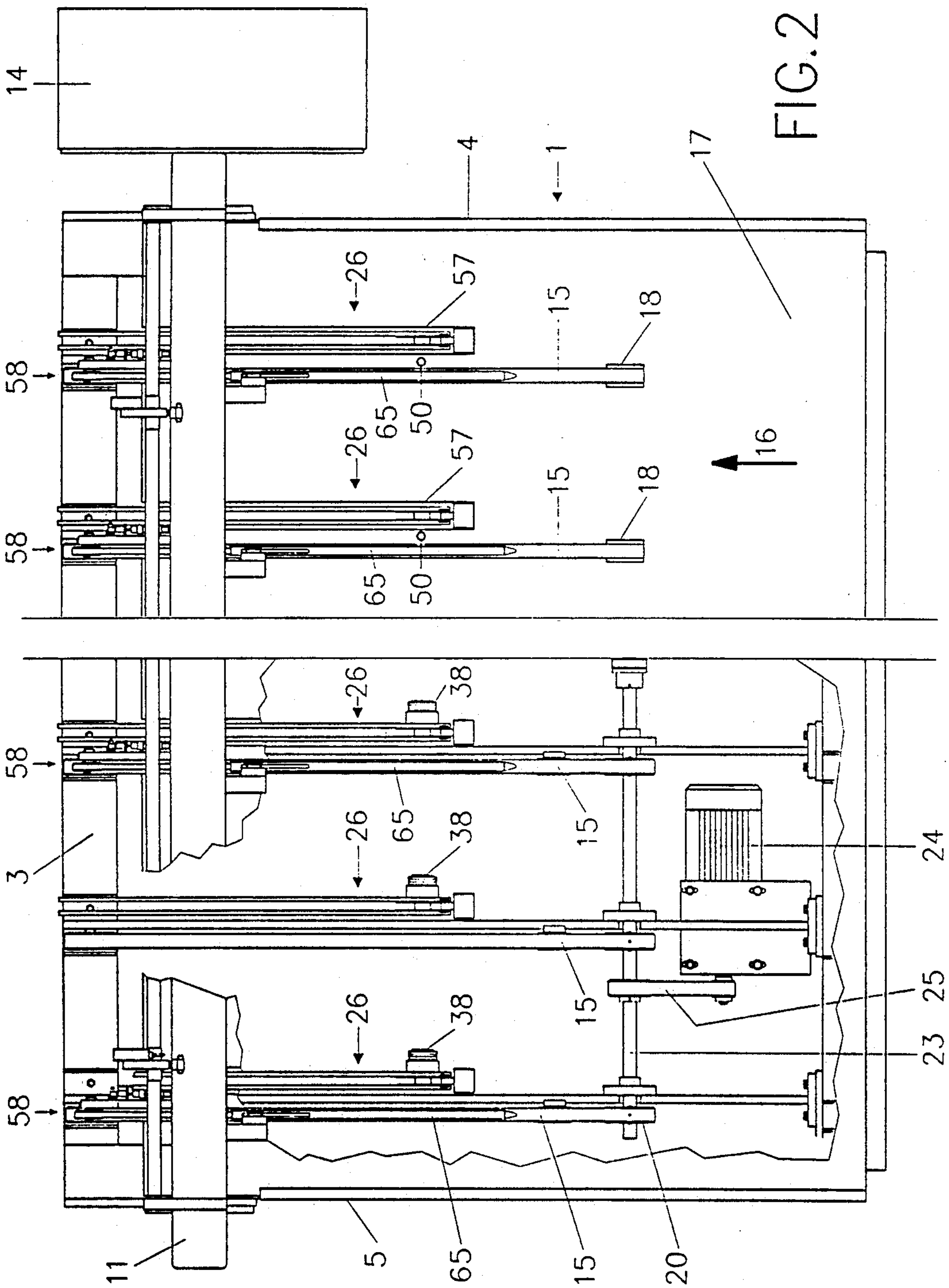
FIG. 2 shows a partly sectioned top view of a veneer strip charging apparatus.
Figure 3:
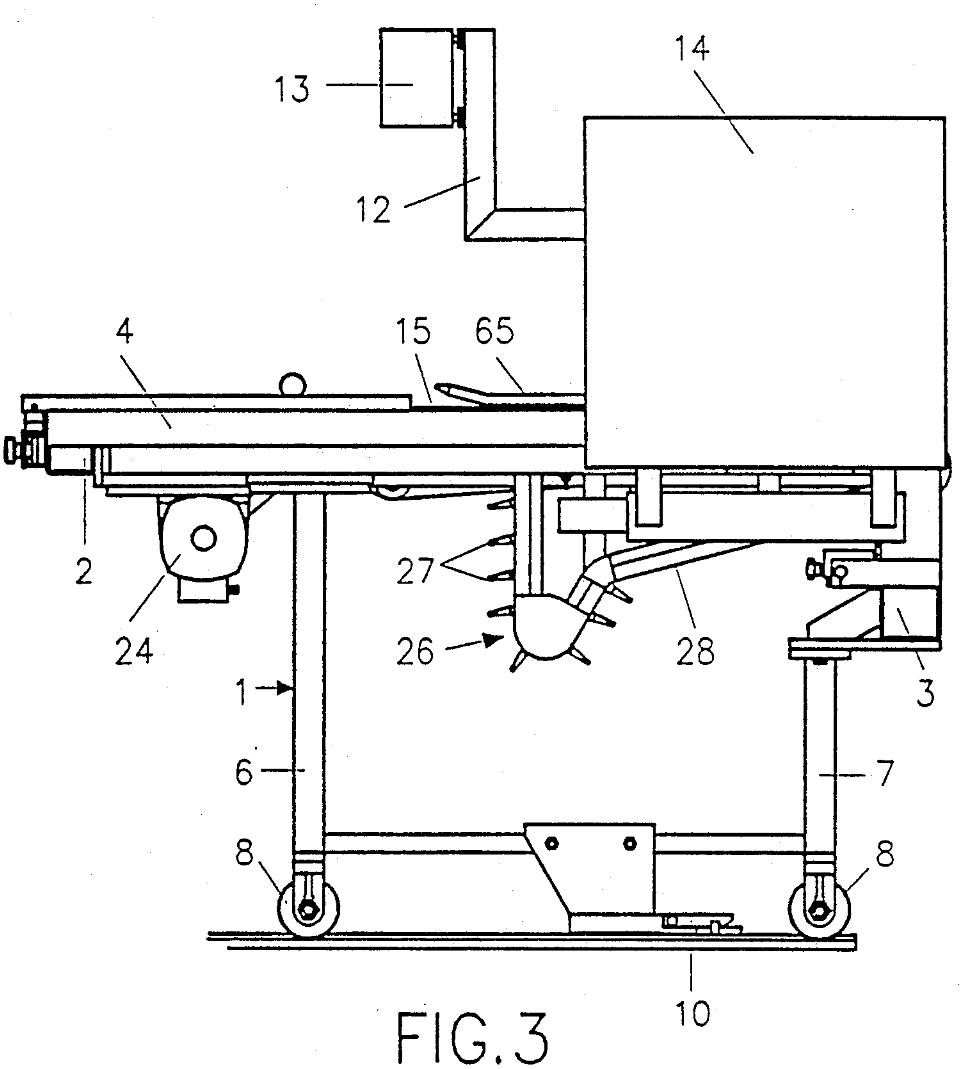
FIG. 3 shows a side view of a veneer strip charging apparatus.

The veneer strip charging apparatus shown in FIGS. 1-3 is based on a movable lower frame 1 which comprises a number of frame portion members 2-5 and a pair of support members 6 and 7 as well as a plurality of connection members not particularly identified. The design of a suitable frame is well known to any person skilled in the art and is not explained in detail.

The lower ends of the support members 6 and 7 are provided with rolls 8 which rest on and are movable along rails 9 fixed to the floor. Thus, the veneer strip charging apparatus can be displaced towards and away from a (not shown) apparatus for joining the veneer strips to form a veneer sheet by mutually gluing together the individual veneer strips along their longitudinal edges. In order to immovably fix the veneer strip charging apparatus in a desired position, a blocking member 10 is provided. The design of a suitable blocking member is known to every person skilled in the art and must not be further explained.

Near the back side of the veneer strip charging apparatus, above the lower frame 1, a transverse bar member 11 is mounted and adapted to receive the holding-down devices which will be further described hereinafter as well as a control unit 13, mounted to a boom 12, and connected to a laterally disposed main control device 14.

The veneer strip charging apparatus is provided with a belt conveyor comprising a plurality of conveyor belts 15 serving as supporting members for the veneer strips to be conveyed, said conveyor belts 15 operating in a plurality of parallel tracks evenly distributed over the width of the veneer strip charging apparatus and which move the individually fed veneer strips in a direction transverse to their longitudinal extension in a conveying direction shown by arrow 16 along a horizontal path only due to the static friction between the veneer strips and the conveyor belts 15. Thereby, the conveyor belts 15 glide on a supporting plate 17 made of sheet metal which extends over the entire width of the veneer strip charging apparatus and from the front side up to near the back side thereof. In order to enable the conveyor belts 15 to pass the supporting plate 17, the latter one is provided with apertures 18 in the region of its input end.

As can be seen from FIG. 1, the supporting plate 17 may be provided with slide paths 19 supporting the individual conveyor belts 15. The slide paths 19 slightly protrude upwards from the top surface of the supporting plate 17. Such upwardly protruding slide paths 19, furthermore, can be provided over the entire extension of the supporting plate 17, seen in the direction of conveying, with the result that the veneer strips laid down on the supporting plate 17 at its input end are supported only by the above mentioned slide paths 19.

Figure 4:
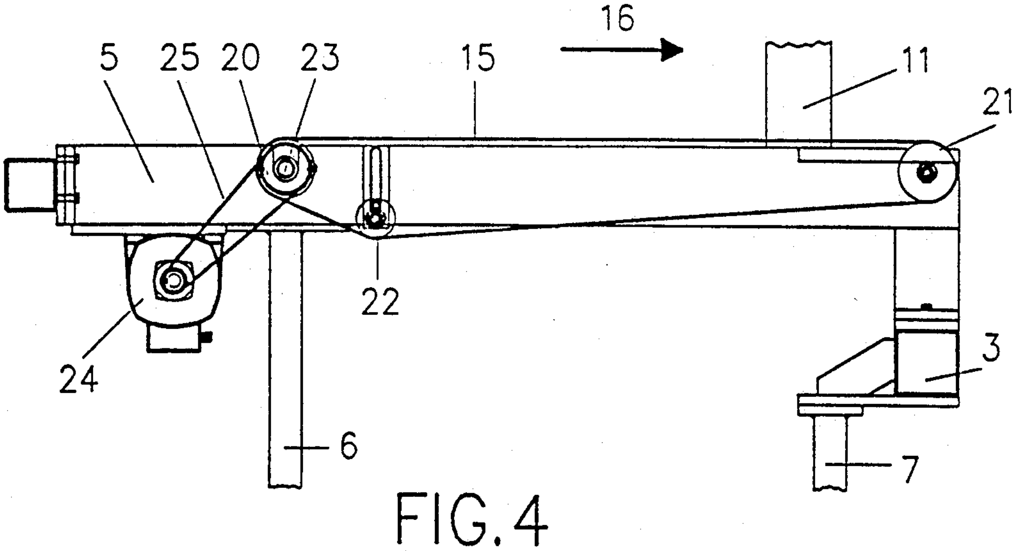
FIG. 4 shows a side view of the conveyor belt drive.
Figure 6:
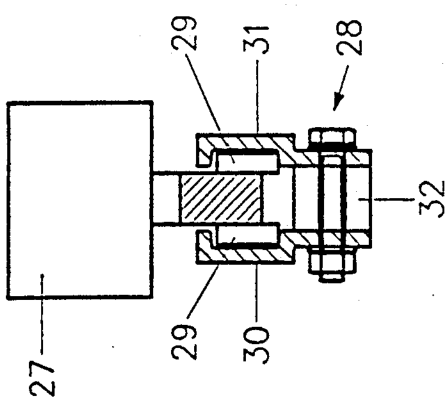
FIG. 6 shows a cross-sectional view of the guiding rail for the spacer members.

According to FIG. 2, a portion of the supporting plate 17 and of the transverse bar member 11 is cut away in order to render the drive for the conveyor belts 15 more visible. Each of the conveyor belts is looped around a front driving pulley 20, a rear deviation pulley 21 and a tensioning pulley 22, as can be seen even more clearly in FIG. 4. The driving pulleys of all conveyor belts 15 are fixed to a common continuous driving shaft 23 which extends over the entire width of the veneer strip charging apparatus. A common driving motor 24 is provided to rotate the driving shaft 23 via a transmission belt 25.

Figure 5:
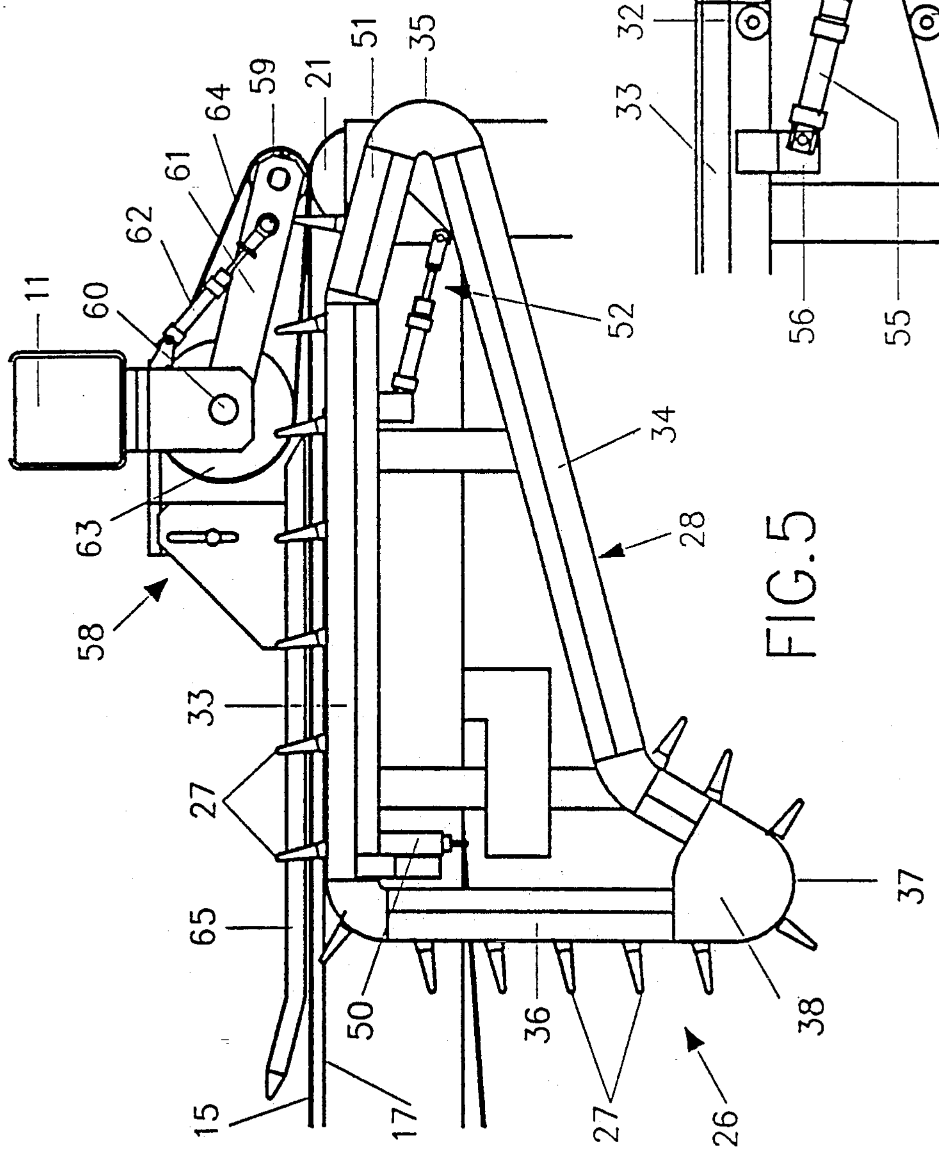
FIG. 5 shows one of the devices for the operation of the spacer members and the devices for holding-down the veneer strip, each assigned to one individual conveyor belt unit, in an enlarged scale.

The veneer strip charging apparatus is equipped with a plurality of equally designed means 26 for the operation of spacer members 27. Each spacer member 27 circulates in an endless circulation track and engages, beside the conveying tracks, between the individual veneer strips, whereby the spacer members 27 are driven along their circulation track by the veneer strips themselves. The purpose of these spacer members 27 is to separate the individual veneer strips which are provided along their longitudinal edges with a heat reactive adhesive, e.g. a hot-melt, from each other during the conveying operation. The means 26 are located below the conveyance level and each comprise a continuous loop guiding rail 28 extending in a vertical plane. Thereby, the spacer members 27 are provided with four rollers 29 which are pair-wise mounted one pair behind the other one and freely rotatable. The rollers 29 engage the guiding rail 28 such that the spacer members 28 are freely movable along the guiding rail. FIG. 5 shows the above mentioned design in a larger scale, while FIGS. 6-10 shown design details of the means 26 for the operation of the spacer members 27.

As already mentioned, the spacer members are equipped with four rollers 29 which are pair-wise located one behind the other pair. According to FIG. 6, the guiding rail 28 is designed such that it encloses the rollers 29 along their outer surfaces. The guiding rail comprises, along its entire length, two rail portions 30 and 31 which are fixed to each other by means of a plurality of distance pins 32.

The guiding rail 28 comprises, as can be best seen in FIG. 5, a first portion 33 extending in horizontal direction and located immediately below the conveyance level constituted by the surface of the conveyor belts 15 as well as second portion 34 situated below said first portion 33 and being inclined with reference to the conveyance level. The first portion 33 and the second portion 34 are connected to each other, at the outlet side of the veneer strip charging apparatus, by means of a first reversing arc portion 35 and, at the other side, by a shaft portion 36 and by a second reversing arc portion 37. In the region of the lower end of the shaft portion 35, situated in the center of the second reversing arc portion, there is provided a stepwise operating elevator 38 which serves to grip the spacer members 27 arriving from the second portion 34 of the guiding rail 28 and displaces them into the shaft portion 36.

Figure 8:
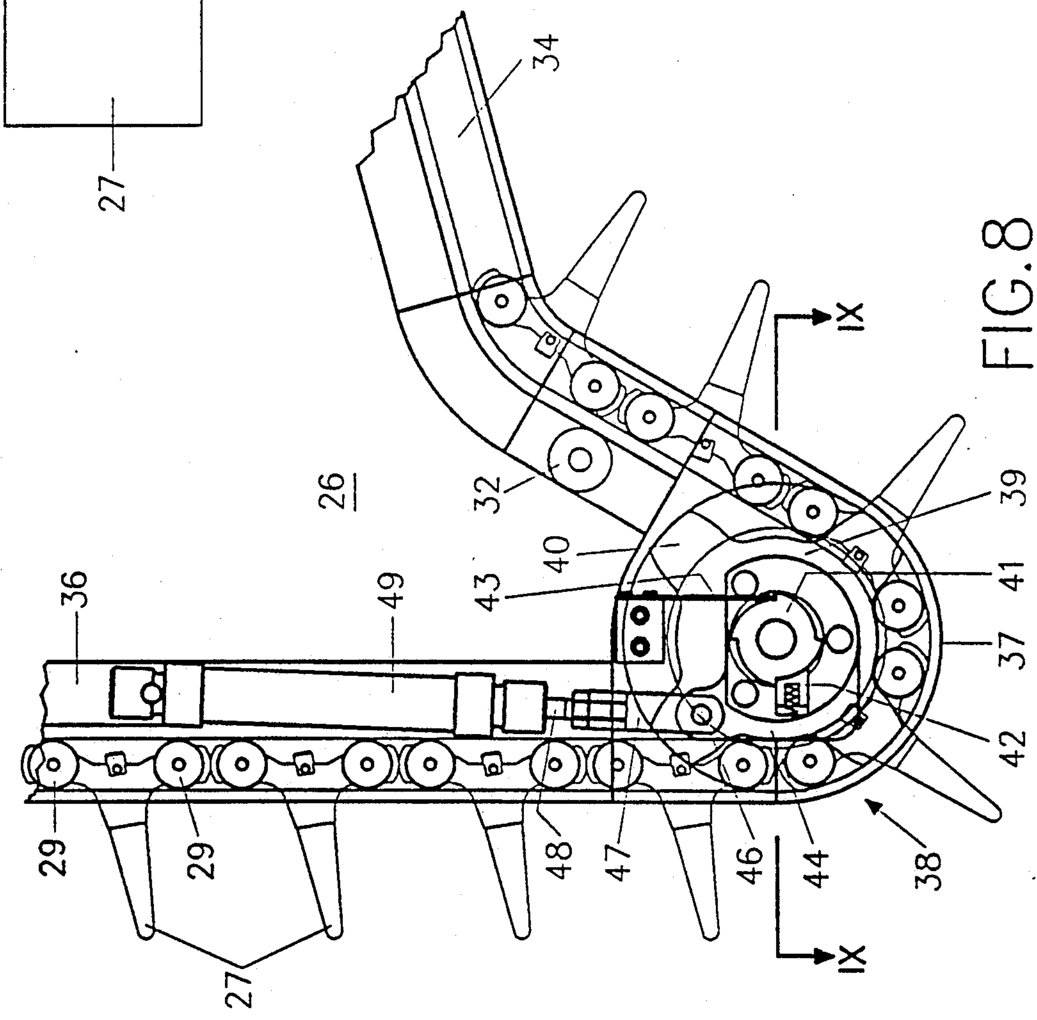
FIG. 8 shows a view of the front end of the guiding rail with the elevator.

The spacer members 27 protrude from the guiding rail 28 in an angle of incidence which differs from the perpendicular to the guiding rail 29, as can be clearly seen in FIGS. 5 and 8. The angle of coincidence is chosen such that the angular orientation of the spacer members 27 differs by the same amount from the perpendicular to the conveyance level regardless whether the spacer members 27 are in the horizontally extending first portion 33 of the guiding rail 28 or in the downwardly inclined end portion 51 of the first portion 33 of the guiding rail 28.

In operation, a plurality of spacer members 27 is present in the shaft portion 36, one above the next one, until the shaft portion 36 is filled with spacer members 27. Thus, be feeding another spacer member 27 into the shaft portion 36 by means of the elevator device 38, all spacer members 27 contained in the interior of the shaft portion 36 are displaced upwards by an amount corresponding to the size of one spacer member 27 with the result that the uppermost spacer member 27 is ejected from the shaft portion 36 and displaced to the start of the first portion 33 of the guiding rail 28.

Figure 9:
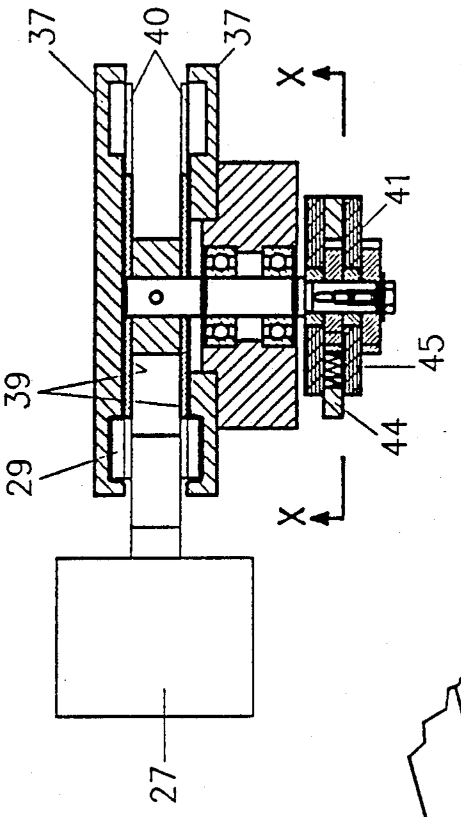
FIG. 9 shows a vertically sectioned view of the elevator along the line IX—IX in FIG. 8.
Figure 10:
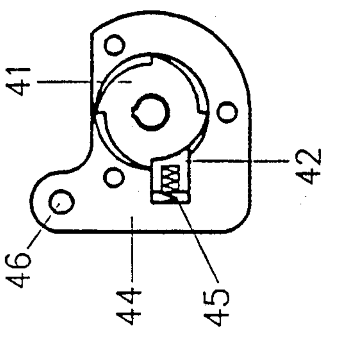
FIG. 10 shows a vertically sectioned view along the line X—X in FIG. 9.

As can be seen from FIGS. 8 and 9, the elevator device 38 comprises a star wheel 39 comprising two star wheels portions fixed to each other in a certain distance. The star wheel 39 is equipped with four grippers 40 which serve to grip the spacer members 27 at their rollers 29. Thereby, the back roller pair of a first spacer member 27 and the front roller pair of an immediately subsequent spacer member 27 are simultaneously gripped with the result that said two spacer members 27 are in intimate contact with each other during their displacement from the second portion 34 via the second reversing arc portion 37 to the shaft portion 36 of the guiding rail 28.

The elevator device 38 comprises a ratchet mechanism to drive the star wheel 39, said ratchet mechanism comprising a stepping wheel 41, a catch member 42 and a resilient stop member 43. The catch member 42 is displaceably mounted within a stepping ring 44 rotatable around the stepping wheel, and the catch member is pressed against the stepping wheel 41 by means of a spring 45. A pushrod 47 is connected to the stepping ring 44 and pivotable around an axis 46. The pushrod 47 is connected to the piston rod 48 of a pneumatic or hydraulic operating cylinder 49 which serves to operate the elevator device 38.

The elevator devices 38 are controlled by photoelectric barriers 50 whereby a photoelectric barrier 50 is assigned to each elevator device 38. The photoelectric barrier 50 comprises a photoelectric beam running perpendicular to the conveyance level. Each veneer strip conveyed by the conveyor belts 15 interrupts the photoelectric beams of the barriers 50, and as soon as the lagging edge of the veneer strip has passed the photoelectric beam, a control signal is generated to activate the elevator devices 38. Upon arrival of the control signal, the elevator device 38 is operated for one step such that a spacer 27 is put out of the shaft portion 36 into the first portion 33 of the guiding rail 28 is then moved to abut against the back longitudinal edge of the veneer strip which has just passed the photoelectric barriers 50.

The first portion 33 of the guiding rail 28 comprises an end portion 51 which is downwardly inclined. The end portion 51 serves to remove the spacers 27 out of the conveyance level. As soon as the spacers 27 have reached the end of said end portion 51, they are out of engagement with the back longitudinal edge of the veneer strip.

The spacers 27 do not protrude from the guiding rail 28 perpendicularly, but with a certain angle of coincidence. This angle of coincidence of the spacers 27 is chosen in dependence from the angle of inclination of the end portion 51 such that the angular orientation of the spacers 27 in the horizontally running first portion 33 differs from the perpendicular to the conveyance by the same amount as in the inclined end portion 51. If the spacers 27 are wedge-shaped, as in the present embodiment shown in the drawings, and if the angle of inclination of the end portion 51 amounts to 15°, it is advantageous to choose an angle of coincidence 10°.

Figure 7:
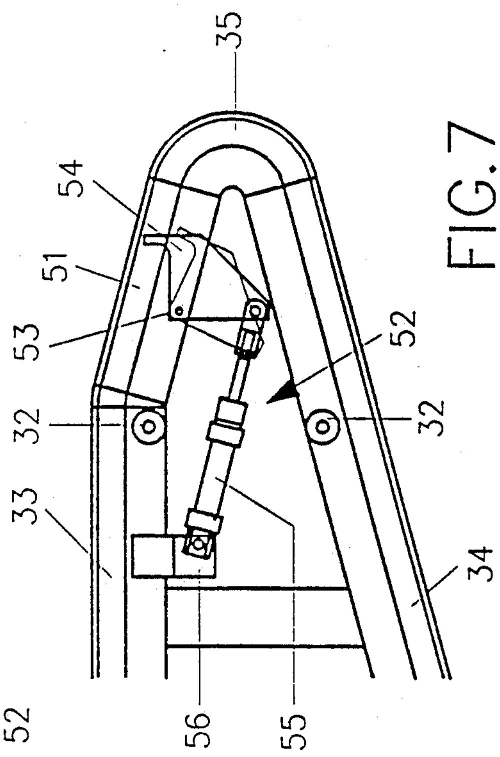
FIG. 7 shows a view of the back end portion of the guiding rail with the stop device.

As can be seen from FIG. 5 and, even clearer, from FIG. 7, a stop device 52 is provided at the end of the first portion 33 of the guiding rail 28, said stop device 52 being effective in the inclined end portion 51 and serves to stop the veneer strips in order to interrupt or discontinuate the formation of a veneer sheet. The stop device 52 comprises a catch member 54 pivotable around an axis 53, said catch member being movable into the path of motion of the spacers 27. For the operation of the catch member 54, there is provided an operating cylinder unit 55 which is connected, on the one hand, to the catch member 54 and, on the other hand, to a fixed bracket 56.

As can be seen from FIG. 2, the supporting plate 17 is provided with a plurality of longitudinal slits 57 in order to enable the spacers 27 to be freely movable along the conveying path of the veneer strips.

A plurality of holding-down devices 28 is provided at the end of the conveying path of the veneer strips, said holding-down devices 58 cooperating with the conveyor belts 15. The holding-down devices 58 press the veneer strips to be charged into the apparatus for joining the veneer strips from upward down against the conveyance level and improve the propulsion of the veneer strips along the conveying path. The holding-down devices 58 are fixed to the already mentioned transverse bar member 11 and comprise each a freely rotatable pressure roller 59 oriented towards and cooperating with the deviation pulley 21 of the related conveyor belt 15. The pressure roller 59 is freely rotatably mounted on the free end of a lever 61 which is pivotally mounted on a shaft 60. A operating cylinder device 62 is provided to deliver the pressure force, said operating cylinder device 62 being connected, on the one hand, to the transverse bar member 11 and, on the other hand, to the pivotal lever 61.

The shaft 60 is further provided with a freely rotatable roller 63, and an endless flat belt 64 is wound around the roller 63 as well as around the pressure roller 59. The flat belt 64 comprises a portion which runs in an acute angle towards the conveyance level in order to facilitate and support the entrance of the conveyed veneer strips between the rollers 21 and 59.

Finally, each holding-down device 59 is provided with a guiding ruler 65 which is adjustable in its height position and which extends above the conveyance level and essentially parallel thereto. It is located opposite to the related conveyor belt 15 and extends over at least a part of the conveying path up to the zone of operation of the holding-down device 58.

What is claimed is:

1. A veneer strip charging apparatus for feeding veneer strips into an apparatus for joining the veneer strips to form a veneer sheet by mutually gluing together the individual veneer strips along their longitudinal edges, said charging apparatus comprising:

a conveying means adapted to move the individually delivered veneer strips along a horizontal path in a direction transverse to their longitudinal extension, said conveying means comprising a plurality of conveying units operating in a plurality of parallel tracks uniformly distributed over the width of the veneer strip charging apparatus;

a plurality of spacer means freely movably guided in the direction of movement of said veneer strips and circulating in endless circulation tracks, said spacer means engaging between the individual veneer strips along the conveying path thereof and being located beside said conveying units, said spacer means being forced to a movement along said endless circulation tracks by said veneer strips;

said conveying means comprising a plurality of conveying belts supported by and gliding on a supporting plate, said conveying belts serving as supporting members for a plurality of veneer strips which are thereby moved along said conveying path solely under the influence of static friction between said veneer strips and said conveying belts; and said endless circulation tracks comprising guiding means for said spacer means which are located below the level of conveyance.

2. A veneer strip charging apparatus according to claim 1 in which said space means are provided with freely rotatable roller means and in which said endless circulation tracks for said spacer means comprise guiding rails, each of said guiding rails forming an endless loop and extending in a vertical plane, said roller means and said guiding rails being adapted to cooperate with each other such that said spacer means are freely movable along said guiding rails.

3. A veneer strip charging apparatus according to claim 2 in which each of said spacer means is provided with two pairs of roller means arranged one behind the other, seen in the direction of movement of said spacer means.

4. A veneer strip charging apparatus according to claim 2 in which each of said guiding rails comprises a first portion extending horizontally and immediately below said conveyance level, a second portion located below said first portion, said first and said second portion being joined together, at the output side of the charging apparatus, by means of a reversing arc portion and, at the input side of the charging apparatus, by means of a vertically extending shaft portion, said second portion being downwardly inclined towards said shaft portion and said shaft portion being provided with an elevator means adapted to convey the spacer means arriving from said first portion through said shaft portion upwards to the beginning of said first portion.

5. A veneer strip charging apparatus according to claim 4 in which said elevator means is located at the lower end of said shaft portion and in which said elevator means is stepwise operating and controlled by the fed veneer strips such that, upon the arrival of a veneer strip, one of said spacer means arriving along said second portion is grasped and fed into said shaft portion whereby all spacer means already present in said shaft portion are moved upwards by an amount sufficient to push the uppermost spacer means in said shaft portion out of it and into said first portion.

6. A veneer strip charging apparatus according to claim 5 in which there is provided a plurality of photoelectric barrier means each assigned to one of said elevator means, said photoelectric barrier means comprising a vertically running beam crossing the path of the veneer strips moved by the charging apparatus whereby the passing of the lagging edge of a veneer strip causes the elevator means to operate for one step.

7. A veneer strip charging apparatus according to claim 5 in which said elevator means comprises a star wheel adapted to grasp one of said spacer means arriving along said second portion.

8. A veneer strip charging apparatus according to claim 7 in which said star wheel grasps said spacer means at their roller means.

9. A veneer strip charging apparatus according to claim 5 in which said star wheel is designed such that it simultaneously grasps a back roller means pair of one of said spacer means and a front roller pair of the subsequent spacer means.

10. A veneer strip charging apparatus according to claim 4 in which said elevator means comprises a ratchet mechanism.

11. A veneer strip charging apparatus according to claim 10 in which there is provided a pneumatic or hydraulic cylinder means adapted to operate said ratchet mechanism.

12. A veneer strip charging apparatus according to claim 4 in which an end portion of said first portion of said guiding rail is downwardly inclined for the removal of the spacer means from the conveyance level such that said spacer means, after having arrived at the end of said end portion, are out of engagement with the veneer strips.

13. A veneer strip charging machine according to claim 12 in which said spacer means protrude from said guiding rail in an angle of incidence which differs from the perpendicular to said guiding rail, whereby said angle of coincidence is chosen such that the angular orientation of said spacer means differs by the same amount from the perpendicular to the conveyance level either when said spacer means are in said horizontally extending first portion of said guiding rail or in said downwardly inclined end portion of said first portion of said guiding rail.

14. A veneer strip charging apparatus according to claim 4 in which a stop means is provided at an end of said first portion of said guiding rail, said stop means having a catch member movable into and out of the guiding track of said spacer means for stopping the veneer strips on order to discontinuate the veneer sheet to be formed.

15. A veneer strip charging apparatus according to claim 14 in which said stop means is located in such a place that it is effective in the region of said downwardly inclined end portion of said first portion of said guiding rail.

16. A veneer strip charging apparatus according to claim 1 in which there are provided a plurality of holding-down means located at the end of the conveyance path for the veneer strips and cooperating with said conveyor belts, said holding-down means pressing said veneer strips to be transmitted to said apparatus for joining said veneer strips down against the conveyance level in order to ensure an improved propulsion thereof.

17. A veneer strip charging apparatus according to claim 16 in which each of said holding-down means comprises a freely rotatable pressure roller cooperating with a final deflection pulley of the assigned conveyor belt, said pressure roller being looped by a flat belt having a portion which runs in an acute angle towards the conveyance level.

18. A veneer strip charging apparatus according to claim 1 in which there is provided a plurality of guiding rulers located above the conveyance level and opposite to said conveyor belts, said guiding rulers extending over at least a part of the conveying path of said veneer strips.

* * * * *

UNITED STATES PATENT AND TRADEMARK OFFICE

CERTIFICATE OF CORRECTION

PATENT NO. : 5,113,997

DATED : May 19, 1992

INVENTOR(S) : Ernst Hunziker

It is certified that error appears in the above-identified patent and that said Letters Patent is hereby corrected as shown below:

Column 12, Line 28, Claim 9, change "5" to --7--.

Signed and Sealed this

Twelfth Day of October, 1993

Attest:

BRUCE LEHMAN

*Attesting Officer* *Commissioner of Patents and Trademarks*